(12) United States Patent
Morris (10) Patent No.: US 8,310,686 B2
(45) Date of Patent: Nov. 13, 2012

(54) METHOD FOR MEASURING THE THICKNESS OR CURVATURE OF THIN FILMS

(75) Inventor: Stephen Morris, Wrexham (GB)

(73) Assignee: Nightingale-EOS Ltd, Wrexham, Clwyd (GB)

( * ) Notice: Subject to any disclaimer, the term of this patent is extended or adjusted under 35 U.S.C. 154(b) by 353 days.

(21) Appl. No.: 12/594,082

(22) PCT Filed: Mar. 28, 2008

(86) PCT No.: PCT/GB2008/001136
§ 371 (c)(1),
(2), (4) Date: Jan. 29, 2010

(87) PCT Pub. No.: WO2008/119984
PCT Pub. Date: Oct. 9, 2008

(65) Prior Publication Data
US 2010/0171965 A1    Jul. 8, 2010

(30) Foreign Application Priority Data
Mar. 30, 2007   (GB) .................................. 0706288.8

(51) Int. Cl.
*G01B 11/28*    (2006.01)
(52) U.S. Cl. ........................ 356/630; 356/632
(58) Field of Classification Search .................. 356/625, 356/630, 635
See application file for complete search history.

(56) References Cited

U.S. PATENT DOCUMENTS

| | | | |
|---|---|---|---|
| 4,999,014 A | 3/1991 | Gold et al. | |
| 5,159,412 A | 10/1992 | Willenborg et al. | |
| 5,912,738 A | 6/1999 | Chason et al. | |
| 5,939,709 A | 8/1999 | Ghislain et al. | |
| 6,031,611 A | 2/2000 | Rosakis et al. | |
| 2003/0223632 A1 | 12/2003 | Freifeld | |
| 2004/0080757 A1 | 4/2004 | Stanke et al. | |
| 2005/0181141 A1 | 8/2005 | Flanagan | |
| 2007/0064247 A1* | 3/2007 | Petit et al. ..................... | 356/625 |

FOREIGN PATENT DOCUMENTS
EP    0397388 A2    11/1990
WO    WO-2005119169 A2    12/2005

OTHER PUBLICATIONS

International Search Report for PCT/GB2008/001136 dated Jun. 5, 2008.
Feder, Donald P., "Optical Calculations with Automatic Computing Machinery," Journal of the Optical Society of America, vol. 41, No. 9, Sep. 1951.

(Continued)

*Primary Examiner* — Tara S Pajoohi Gomez
(74) *Attorney, Agent, or Firm* — Bingham McCutchen LLP (57) ABSTRACT

A method and means for determining the thickness, or curvature, of a thin film or stack of thin films disposed on the surface of a substrate having a curvature comprising generating a beam of radiation, focusing the beam through the one or more films onto a surface of the substrate, measuring the intensity across the reflected beam as a function of the angle of incidence of a plurality of rays derived from the focussed beam, determining the path of each of the plurality of rays and determining the thickness, or curvature of the film, or films, from the angular dependent intensity measurement.

19 Claims, 5 Drawing Sheets

OTHER PUBLICATIONS

Flaherty, Tony, et al., "Application of Spectral Reflectivity to the Measurement of Thin-Film Thickness," Proceedngs of SPIE, vol. 4876 (2003), p. 976-983.

Groenewald, J. Tapson, et al., "Substrate Curvature Measurement System," Dielectric Materials, Mesurements and Applications Conference Publication No. 473 IEEE 2000, p. 458-463.

Novak, Erik, "Getting to the Heart of the Matter," SPIE's oemagazine, Jun./Jul. 2005.

Rosakis, A.J., et al., "Full Field Measurements of Curvature Using Coherent Gradient Sensing: Application to Thin Film Characterization," Thin Solid Films 325 (1998) p. 42-54.

Rosencwaig, Allan, et al., "Beam Profile Reflectometry: A New Technique for Dielectric Film Measurements," Appl. Phys. Lett. 60 (11), Mar. 16, 1992, p. 1301-1303.

Taylor, C., et al., "A Laser-Based Thin-Film Growth Monitor," The Industrial Physicist, Mar. 1998, p. 26-30.

Wang, J., et al., "Surface Residual Stress Measurement Using Curvature Interferometry," Experimental Mechanics (2006) 46:39-46.

\* cited by examiner

Figure 1

PRIOR ART

METHOD FOR MEASURING THE THICKNESS OR CURVATURE OF THIN FILMS

CROSS-REFERENCE TO RELATED APPLICATIONS

This application is the national phase of International (PCT) Patent Application Serial No. PCT/GB2008/001136, filed on Mar. 28, 2008, published under PCT Article 21(2) in English, which claims priority to and the benefit of British Patent Application No. 0706288.8, filed on Mar. 30, 2007, the disclosure of each of which is incorporated herein by reference.

The present invention relates to methods for measuring the thickness of thin films and particularly methods for measuring the thickness of thin films having a curvature.

Known methods of measuring the thickness of films on a substrate rely upon the observation of interference effects in light reflected from the film to be measured. Such methods utilise adapted forms of spectrophotometry, reflectometry and ellipsometry. Each of these methods involves observing how the parameters defining a light ray reflected from a film vary as a function of the thickness and optical properties of the film. Such parameters may be, for example, spectral composition, variation of reflectance as a function of angle of incidence, the phase of the light, or any combination of the aforementioned parameters.

For example, Patent No. EP0397388 discloses a method and apparatus for measuring thickness of thin films. This method is a Beam Profile Reflectometry method which utilises a focused laser beam incident on a film and measures the reflectance as a function of the angle of incidence at a single wavelength. Because the laser beam is coherent it has a relatively small measurement spot size, which may typically be less than 1 μm diameter for laser light of visible wavelengths.

However, these known methods are disadvantaged in that they are only applicable, with sufficient accuracy, where the substrate on which the film lies is locally flat. Where the substrate, and therefore the film, has curvature the reflected light, from which the thickness of the material is determined, has a different angular trajectory from the incident light. This results in difficulties in physically capturing the reflected light and in interpreting the resulting interference effects thereof.

It is therefore desirable for there to be a method of determining the thickness of a film disposed on a curved substrate.

It is also desirable for there to be a method of determining the curvature of a curved film and/or substrate.

According to the present invention there is provided a method of determining the thickness or curvature of a thin film, or stack of thin films, disposed on the surface of a substrate having curvature, comprising the steps of generating a beam of radiation, focusing the beam through the at least one film onto the substrate, measuring the intensity across the reflected beam, in the Fourier plane, as a function of the angle of incidence of a plurality of rays derived from the focussed beam, determining the path of each of the plurality of rays, and determining the thickness or curvature of the film from the angularly dependent intensity measurements.

Prior to measuring the intensity across the reflected beam, a plurality of predetermined angles of incidence are advantageously selected, corresponding to positions in the Fourier plane, each angle corresponding to one of the plurality of rays.

The step of determining the path may comprise, for each selected angle of incidence: determining the angles of incidence, reflection and refraction for each ray travelling through the, or each, film; determining the angle ($\delta$) circumferentially swept as the ray travels, through the, or each, film between interfaces, relative to the centre of curvature of the substrate; determining the path length of the ray through the, or each, film; and, determining the reflectance and transmission at each interface on which the ray is incident.

The thickness, or curvature, of the at least one film may be determined by: determining for each selected angle of incidence and each individual path the angle of reflectance and complex amplitude of reflected light, in the Fourier plane; for each path interpolating between each of the angles of reflection in the Fourier plane and thereby determining the complex amplitude of the reflected light at angles corresponding to each angle of incidence, summing the complex amplitudes associated with each path at each said angle of incidence thereby determining the total amplitude at each angular position in the Fourier plane; multiplying each total amplitude by its complex conjugate and determining the intensity variation within the Fourier plane therefrom.

By repeating this procedure in two orthogonal planes parallel and perpendicular to the polarisation of the incident laser light, the reflectance functions of the p-polarised and s-polarised light may separately be obtained.

The beam of radiation is advantageously focussed substantially normal relative to a tangential plane of the curvature of the substrate.

The beam of radiation is focussed to a diameter of approximately 1 μm or less. The beam is preferably a laser beam.

The method is advantageously implemented by computer program.

The present invention will now be described in detail with reference to the accompanying drawings, in which.

Figure 1:
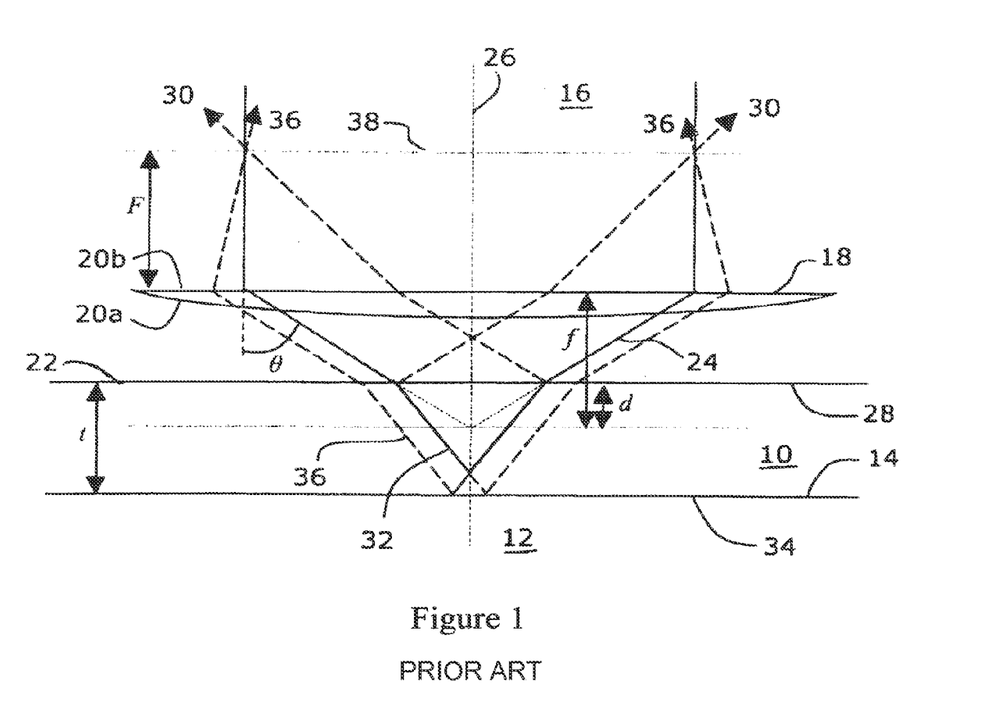
FIG. 1 is a schematic drawing of a known method of determining the thickness of a thin film disposed on a flat substrate, according to the prior art.

Referring to FIG. 1, a known method of measuring the thickness of a thin film 10 disposed on a substrate 12 having a flat surface 14 is shown. The thin film 10 is of thickness t. This known method, of Beam Profile Reflectometry, is disclosed in Patent No EP0397388 and involves focussing a laser beam 16 onto the flat surface 14 using a lens 18. The lens 18 has a front principal surface 20a and a rear principal surface 20b. In free space, the lens 18 brings the light to focus at a distance f from the front principal surface 20a. This provides a notional focus point within the film 14, at a distance d from the external surface 22 thereof, on which the beam 16 is incident.

Light 24, from the beam 16, is incident on the surface 22 at an initial angle θ, relative to the principal axis 26 of the beam 16. A portion of the light 24 is reflected back at the free space-film interface 28 towards the lens 18, as first instance reflected light 30. The remainder of the light 24 (i.e. that which has not been reflected in the first instance) travels into the film 10 as transmitted light 32 and undergoes refraction. The transmitted light 32 is incident on the film-substrate interface 34 from which it is reflected back towards the free space-film interface 28 as second instance reflected light 36. The second instance reflected light 36 is that of the transmitted light 32 less any loss due to absorption within the film 10 or transmission into the substrate 12. Upon leaving the film 10 the second instance reflected light 36 is refracted and travels through free space towards the lens 18. It will be appreciated that there is also a degree of reflection of the second instance light 34 back into the film 14 at the free space-film interface 28.

The first and second instance reflected light rays, 30 and 36 respectively, return to the lens 18 parallel, though laterally spaced apart, relative to each other. The lens 18 causes the first and second instance reflected light rays, 30 and 36, to recombine and interfere with each other in the Fourier plane 38. The Fourier plane is a distance F from the rear principal surface 20b of the lens 18. By observing light from a series of different angles of incidence, corresponding to different lateral positions across the beam 16, and considering the symmetry of the beam 16 about its principal axis 26, an interference pattern is formed in the Fourier plane 38 indicative of the film thickness.

Figure 2:
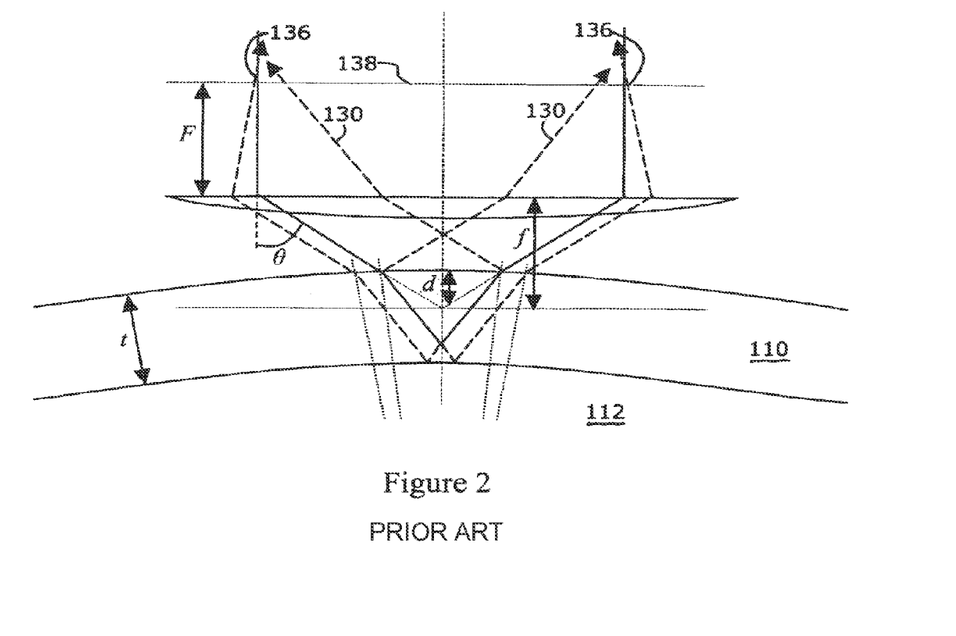
FIG. 2 is a schematic drawing of the known method of FIG. 1, applied to a thin film disposed on a curved substrate.

Referring to FIG. 2, using the same known method to analyse a film 110 disposed on a substrate 112 having curvature results in the first and second instance reflected light rays, 130 and 136 respectively, emerging in a non-parallel relationship. Therefore they do not recombine in the Fourier plane 138 and consequently the interference pattern formed in the Fourier plane 38 is not reliable for determining the film thickness.

Figure 3:
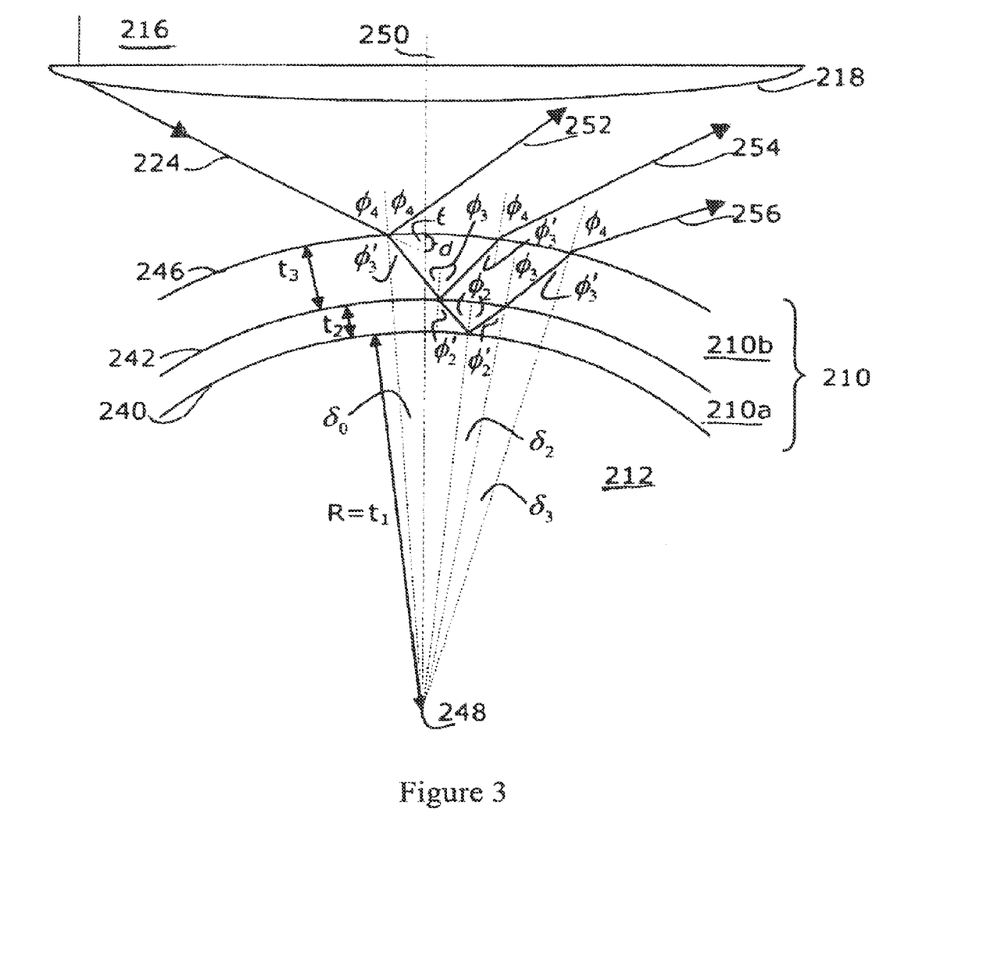
FIG. 3 is a schematic drawing of a method according to the present invention.

Referring to FIG. 3, the notation used herein to describe the method of the present invention is illustrated.

A film stack 210 is disposed on a substrate 212, having a curved surface 240. The film stack 210 is formed from a first film 210a, disposed on the curved substrate 212, and a second film 210b disposed on the first film 210a.

The first film 210a and the substrate 212 form a first film-substrate interface 240. Similarly, the second film 210b and the first film 210a form a first film-second film interface 242. The second film 210b further comprises an outer face 246, which, in this example is the outermost face of the filmstack 210.

However, it will be appreciated that the method and notation, described herein, is equally adaptable to film stacks having a lesser or greater number of films disposed on a curved substrate. The film stack 210 is positioned, relative to a lens 218, such that a centre of curvature 248 of the substrate lies on the lens axis 250.

All angles of incidence, reflection and refraction are referred to either as $\phi$ or $\theta$, where $\phi$ is an angle relative to the "local normal", i.e. the datum extending from the centre of radius of curvature 248 to the point at which the light ray intersects a particular interface under consideration, and $\theta$ is an angle relative to the datum extending parallel to the lens axis 250.

Subscripts of $\phi$ refer to the film within which the angle is formed, for example $\phi_1$ refers to an angle formed within the first film 210a, relative to the local normal, and $\phi_2$ refers to an angle formed within the second film 210b, relative to the local normal. A primed notation refers to an angle formed at an outer face of a particular film and an unprimed notation refers to an angle formed at an inner face of a particular film; for example $\phi'_1$ refers to an angle formed at the outer face 242 of the first film 210a, relative to the local normal, and $\phi_1$ refers to an angle formed at the inner face 240 of the first film 210a. The same primed and unprimed notation applies to inner and outer faces, 244 and 246, of the second film 210b.

The angle formed at the centre of curvature between a point at which a light ray enters the first or second film, 210a or 210b, and the same light ray leaves the respective film is denoted by $\delta$. Subscripts of $\delta$ relate to the film in which the light ray is travelling such that $\delta_1$ relates to the first film 210a and $\delta_2$ relates to the second film 210b. An exception being $\delta_0$, which relates to the angle made at the centre of curvature 248 between the lens axis 250 and the point at which an incoming light ray intersects the outermost surface of the film stack 210, which in the example of FIG. 3 is outer face 246 of the second film 210b.

The lens 218 focuses a laser beam 216 onto the substrate 212 as described with reference to FIGS. 1 and 2. However, due to the curvature of the substrate and the optical properties of the film stack, for any given initial angle of incidence $\theta$ of light ray 224 incident on the outer face 246, of the second film 210b, there are multiple reflected light rays, for example 252, 254 and 256, which exit the film stack 210 at different points along the outer face 246 of the second film 210b and at different angles. Therefore, the reflected light rays in the Fourier plane do not correspond to any of their initial angles of incidence $\theta$.

In order to determine the thickness or curvature of the film a list is initially created of all the different paths which a predetermined number of light rays may take through the film stack. For example, in FIG. 3 there are three different rays of light, 252, 254 and 256, exiting the outer face 246 of the second film 210b. Each exiting light ray (252, 254 and 256) originates from the same incident light ray 224.

For each individual path, which each light ray takes, the exit angle $\phi$ is determined relative to the angle of incidence $\theta$, given particular values for the filmstack properties, substrate curvature and $\delta_0$.

For each predetermined angle of incidence, the amplitude reflection and transmission coefficients for each film in a filmstack are calculated for the respective light ray travelling inwardly (i.e. in the general direction of the centre of curvature) and outwardly.

The expressions used to calculate the above are Fresnel equations, as follows, where $n_1$ and $n_2$ can in general be complex:

For the amplitude reflection at the interface 242 of the second film 210b and first film 210a for a light ray 324 travelling inwardly:

For $s$-polarization (1)

$$r_s = \frac{n_2 \cos\varphi_2 - n_1 \cos\varphi'_1}{n_2 \cos\varphi_2 + n_1 \cos\varphi'_1}$$

and for $p$-polarization $$r_p = \frac{n_1 \cos\varphi_2 - n_2 \cos\varphi'_1}{n_1 \cos\varphi_2 + n_2 \cos\varphi'_1}$$

For the amplitude transmission at the interface 242 of the second film 210b and first film 210a for a light ray 324 travelling inwardly:

For $s$-polarization (2)

$$t_s = \frac{2 n_2 \cos\varphi_2}{n_2 \cos\varphi_2 + n_1 \cos\varphi'_1}$$

$$\equiv 1 + r_s$$

and for $p$-polarization $$t_p = \frac{2 n_2 \cos\varphi_2}{n_1 \cos\varphi_2 + n_2 \cos\varphi'_1}$$

For the phase change of the light ray traversing a film from the inner face to the outer face thereof, or vice versa:

$$\psi = e^{-a\zeta} \quad (3)$$

where $\zeta$ the length of the path the light ray takes travelling though the film, and $$a = 2i \cdot \pi \cdot n / \lambda$$

These above expressions for a and $\psi$ are the same for s and p polarization, provided there is no birefringence in the film.

Figure 4:
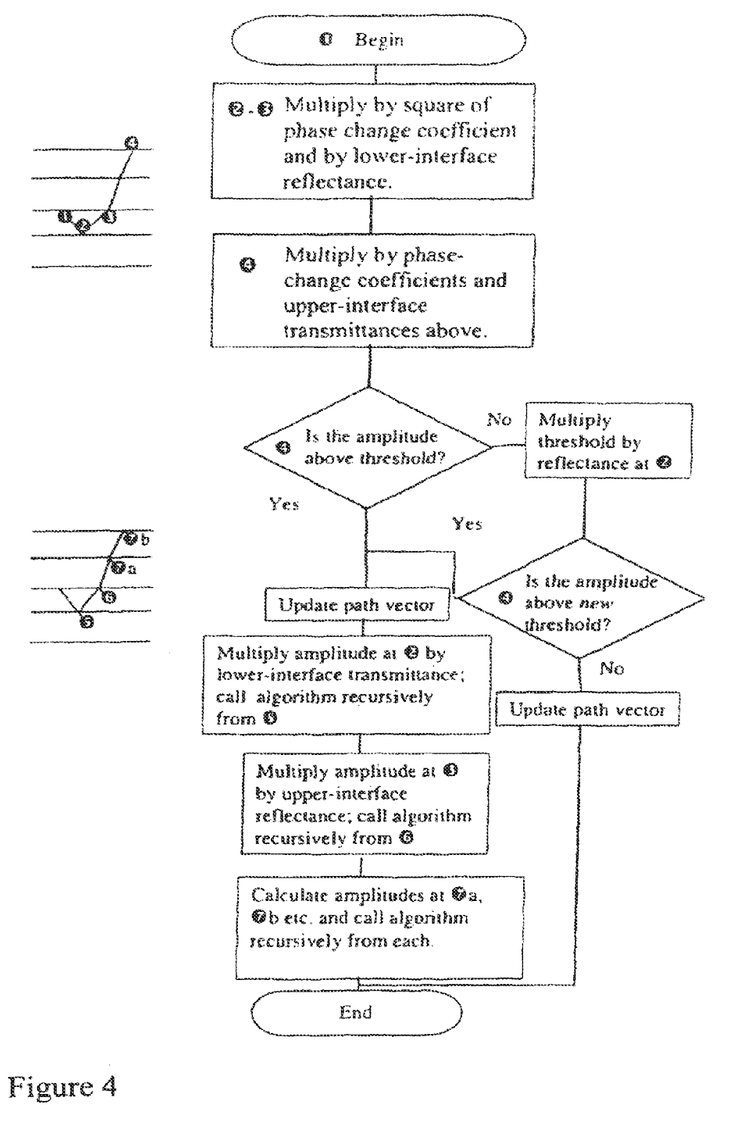
FIG. 4 is a flowchart illustrating an algorithm for carrying out the method of FIG. 3.

Referring also to FIG. 4, an algorithm is used in which a given light ray is considered, having an initial amplitude, travelling inwardly from an outer interface. The initial amplitude is multiplied by the square of the phase change coefficient of the layer and the reflection coefficient of the inner face. This represents the light ray travelling inwardly to the inner face of the film, being reflected therefrom and travelling back outwardly to the outer face. Where the refractive index n of the film has an imaginary component, the film is absorbing and the complex phase change $\psi$ incorporates the attenuation in ray amplitude caused by this absorption.

The product of the outward transmittances at each of the interfaces and the absorption is calculated for each film, which the light ray travels through before it exits the filmstack into the surrounding environment.

Referring to FIGS. 3 and 4, the amplitude of the ray, which exits the filmstack 210, is then compared with an appropriate threshold value. If the threshold value is exceeded, then the following steps are followed:

1. The amplitude that the ray was originally found to have at its lower interface (i.e. its starting amplitude multiplied by the phase change coefficient) is multiplied by the transmission coefficient between current layer and the layer below, in order to represent the effect of the ray being transmitted into that layer. The algorithm is then called again, recursively, starting at this point and with this amplitude.
2. The ray's amplitude at the top of the current layer (i.e. its starting amplitude multiplied by the square of the phase change coefficient and the reflectance at the lower boundary of the layer) is multiplied by the reflection coefficient at the boundary between the current layer and the layer above, in order to represent the effect of the ray being reflected back down again from this upper interface. The algorithm is then called again, recursively, starting at this point and with this amplitude.
3. The amplitude is multiplied by the transmission coefficient between the current layer and the layer above and then, if applicable, by the phase change in that layer and then the reflectance coefficient at the layer's upper boundary. The algorithm is called again recursively, starting at this point and with this amplitude. The same procedure is repeated for each of the remaining layers between the current layer and the topmost interface in the stack.

If the amplitude of the light ray does not exceed the threshold, then it is checked whether the amplitude of the light ray after the first reflection at the innermost interface may have been below the threshold because so much of the light ray may have been transmitted into the substrate. This can occur if the refractive indices of the two layers are similar. This is carried out by re-checking the final amplitude against the product of the threshold value and the bottom interface reflectance of the original layer. If the amplitude is found to be above the new threshold, then the algorithm is called again, recursively, beginning just below the first film's lower boundary.

For computational purposes, the complete path of each light ray through the filmstack, including the angles of travel and lateral displacements, is represented by a vector of integers, wherein each integer represents a layer of the filmstack. For example, if the substrate is "layer 1" then the light ray paths shown in FIG. 3 can be represented by the vectors:

[4 4]

[4 3 3 4]

and

[4 3 2 2 3 4]

respectively. Each such vector comprises a full description of the path, because the angles $f_i$ and $f'_i$ are the same at each encounter with a given interface regardless of the ray's path between encounters.

Vectors describing the path are built up as follows. Every time the algorithm is called, the stem of the vector describing the light ray's progress through the filmstack, to the point where it is called, is copied into a new vector and passed to the new instance of the algorithm as an argument. Each time the light ray's amplitude is found to be above the threshold, integers are added onto the vector to account for each film that the ray will have passed through since the last check took place. When the light ray is found to have exited the filmstack, the resulting vector is added as a new column to a master matrix, which records all the light rays that have successfully traveled through and exited the filmstack. If the amplitude of a light ray is found to be below the threshold, then the current vector stem is deleted and the algorithm finishes.

In order to start the algorithm, the ray amplitude is set to unity and the current film is set to be the uppermost layer of the filmstack. From this point the algorithm drives itself, calling itself recursively as often as necessary. When it finally returns to the program that originally called it, it will have populated the master matrix with vectors corresponding to each of the viable paths through the filmstack for a particular angle of incidence. The procedure is then repeated for as many other angles of incidence as required.

Expressions for the angles and paths described above are given below.

Using the notation referred to in FIGS. 2 and 3 where:

d is the focus offset of the lens (i.e. the downward displacement of the lens relative to the plane on which it would have been focused at the uppermost face of the filmstack).

t is the thickness of each film or in the case of $t_1$ the "thickness" of the substrate (i.e. the radius of curvature).

n is the refractive index of each film.

N is the total number of layers (including films and the substrate) with different refractive indices in the film stack, but not including the surrounding environment. N is therefore equal to the number of films plus one, and $\theta$, $\delta_n$, $\psi_n$, $\psi'_n$, and $\zeta_n$—have been defined previously.

Then $$\varphi_n = \sin^{-1}\left(\frac{\left(\sum_{i=1}^{N} t_i\right) - d}{n_n \cdot \sum_{i=1}^{n-1} t_i} \sin\theta\right) \quad (4)$$

$$\varphi'_n = \sin^{-1}\left(\frac{n_{n+1}}{n_n} \cdot \sin\varphi_{n+1}\right) \quad (5)$$

-continued $$\delta_0 = \theta - \varphi_{N+1} \quad (6)$$
$$\delta_n = \varphi_n - \varphi'_n$$

and $$\zeta_n = \left(\sum_{i=1}^{n} t_i\right) \cdot \frac{\sin\delta_n}{\sin\varphi_n} \quad (7)$$

Although the surrounding environment is considered not to be included in the filmstack, using equation (4) values for the surrounding environment can be calculated using the following expression:

$$\varphi_{N+1} = \sin^{-1}\left(\frac{\left(\sum_{i=1}^{N} t_i\right) - d}{\sum_{i=1}^{N} t_i} \sin\theta\right) \quad (8)$$

which may be substituted into equation (6) to obtain $\delta_0$, as required.

In order to complete the construction of the total reflectance at a particular angle of reflection it is necessary to determine a further phase factor.

In the case of a filmstack disposed on a flat substrate light rays pass through the films and are reflected from the lower film-to-film, or film-to-substrate, interfaces. Having been reflected the light rays interfere with other light rays originating at the same angle of incidence having been reflected from the outermost face of the filmstack. These other light rays can be used as a reference to calculate relative phase difference of light rays which have penetrated the filmstack. However, for a filmstack disposed on a curved substrate, the light rays reflected from the outermost face of the filmstack have different angles of reflection and therefore do not have any correlation with light rays, originating from the same angle of incidence, which have penetrated the filmstack. Therefore, for the present invention, the phase differences of the light rays which have penetrated the filmstack are calculated relative to alternative light rays which have the same angle of reflection but a different angle of incidence.

Figure 5:
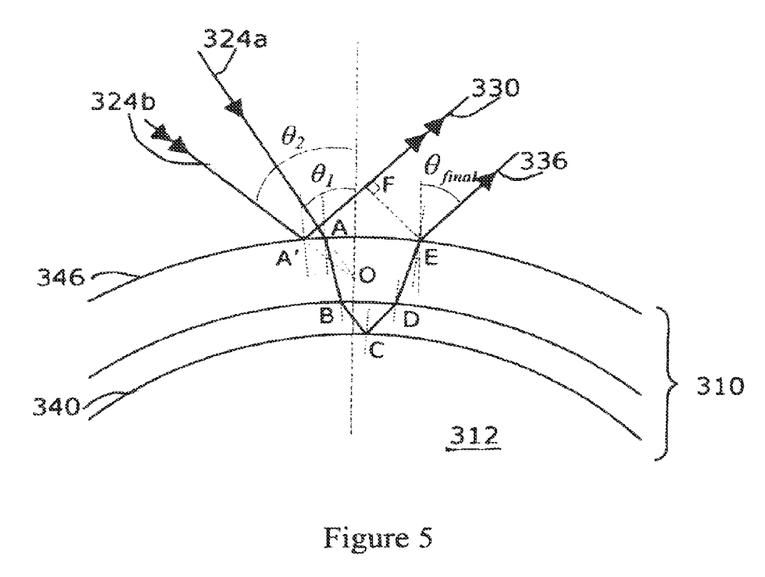
FIG. 5 is a schematic drawing showing the path taken by associated light rays for the method of FIG. 3.

Referring to FIG. 5, for a filmstack 310 disposed on a curved substrate 312, light ray 324a, incident at an angle designated $\theta_1$ penetrates the film stack and is reflected at the first film-substrate interface 340. This second instance reflected light ray 336 exits the filmstack 310 at a specific angle of reflectance $\theta_{final}$.

Light ray 324b, incident at an angle designated $\theta_2$, reflects off the outermost face 346 of the filmstack, as first instance reflected light rays 330. If the first instance reflected light ray 330 has the same angle of reflection $\theta_{final}$ as the second instance reflected light ray 336 then the lens will combine these rays and cause them to interfere in the Fourier plane. The condition which $\theta_2$ must fulfil to achieve this outcome is given later.

The path difference between the two light rays is calculated starting from the point at which the two light rays are in phase with each other, that point being the original focal point 'O' of both incident light rays, 324a and 324b.

The optical path difference of the two rays, 324a and 324b, is then given by:

$$\Lambda = [-AO + n_1(AB+DE) + n_2(BC+DC)] - [-A'O + A'F]$$

The lengths AB, BC, CE and DE can be found directly from equation (7). By analogy with equation (7), if the angles subtended at the centre of curvature by A and A' are denoted to be $\delta_A$ and $\delta_{A'}$, respectively, each of which is obtainable from equations (6) and (8) when the respective values of $\theta_1$ and $\theta_2$ are known, then:

$$AO = \left(\sum_{i=1}^{N} t_i\right) \cdot \frac{\sin\delta_A}{\sin\theta_1} \quad (9)$$

and $$A'O = \left(\sum_{i=1}^{N} t_i\right) \cdot \frac{\sin\delta_{A'}}{\sin\theta_2} \quad (10)$$

The length A'F is given by:

$$A'F = 2\left(\sum_{i=1}^{N} t_i\right) \cdot \sin\frac{\delta_{tot}}{2} \cdot \sin\left[\varphi_{N+1} + \frac{\delta_{tot}}{2}\right] \quad (11)$$

where $\delta_{tot}$ is the angle subtended by the arc A'E at the centre of curvature, which can be constructed by summing the various values for $\delta_n$, for the specific path taken by the light ray. To complete the calculation it is necessary to determine $\theta_n$ given the angle of reflectance, $\theta_{final}$, at which light rays 330 and 336 both travel to the lens from the outermost face 346 of the filmstack. $\theta_{final}$ is also derived by summing the values for $\delta_n$ relative to the angle of incidence $\theta_1$. The expression for $\theta_2$ is then:

$$\theta_2 = \theta_{final} + 2\delta_{A'} \quad (12)$$

Therefore, the complete method for deriving the Fourier plane intensity variation from which the thickness, or curvature, of a film, or filmstack, disposed on a substrate having curvature, can be expressed as an algorithm, as follows.

(1) Choose starting values for all the parameters that describe the filmstack and substrate, such as thicknesses, complex refractive indices and radius of curvature;
(2) Select a set of angles θ corresponding to specific locations within the Fourier plane;
(3) For each angle in the set, calculate $\delta_n$, $\phi_n$, $\phi'_n$, $\zeta_n$ for each film layer as described in equations (4) to (8).
(4) Calculate the reflectance and transmission, at each interface and in each direction corresponding to each starting angle as selected in (2).
(5) Determine the path that each light ray travels along through the film stack.
(6) For each starting angle selected in step (2) and each path determined in (5), calculate the complex amplitude of the reflected light ray at each angle of reflectance $\theta_{final}$ including phase difference using equations (9) to (12).
(7) For each path determined in step (5), interpolate between the reflectance angles $\theta_{final}$ calculated in step (6) in order to obtain the overall complex amplitude at the points in the Fourier plane corresponding to the set of angles θ selected in step (2).
(8) At each of the angles θ, sum over all the paths determined in step (5) to obtain the total complex field amplitude.
(9) Multiply each complex amplitude value in the Fourier plane by its complex conjugate in order to obtain the intensity variation within the plane.
(10) Repeat for the alternative polarisation, i.e. if the above algorithm has been carried out for s-polarization then repeat the algorithm for the p-polarization, or vice versa.

(11) Compare the calculated Fourier plane intensity variations thus obtained with measured data from an appropriate experimental apparatus.

(12) Iteratively refine the values for the filmstack parameters defined in step (1) so as to optimise agreement between the calculated and measured Fourier plane intensity variations.

The method according to the present invention may be applied to determine the thickness and/or curvature of structures having curvature and one or more thin films. In particular, the method according to the present invention is applicable to determining the thickness and/or curvature of films disposed upon small implantable medical devices such as, for example, cardiac stents or similar structures, during, for example, the quality control process of the manufacturing thereof.

The invention claimed is:

1. A method of determining the thickness, or curvature, of structures having curvature and one or more thin films, comprising the steps of:
   generating a beam of radiation;
   focusing the beam through the at least one film;
   measuring the intensity variations across the reflected beam in the Fourier plane;
   for each of a plurality of angles of reflectance corresponding to positions within the Fourier plane, (i) determining, based at least in part on parameters chosen to describe the one or more films, the paths of a plurality of rays sharing the angle of reflectance but having different angles of incidence and computing complex amplitudes of reflected light associated with the rays, and (ii) summing over the complex amplitudes associated with the paths, thereby obtaining calculated Fourier plane intensity variations;
   comparing the calculated Fourier plane intensity variations with the measured intensity variations; and
   iteratively refining the parameters so as to optimize agreement between the calculated and measured intensity variations to thereby determine the thickness or curvature of the one or more films from the angularly dependent intensity measurement.

2. The method of claim 1, further comprising selecting a plurality of predetermined angles of incidence.

3. The method of claim 2, wherein the thickness, or curvature, of the at least one films is determined by:
   determining for each of the selected angles of incidence and each individual path the angles of reflectance associated therewith, and
   interpolating between each of the angles of reflectance in the Fourier plane and thereby determining the complex amplitude of the reflected light at angles corresponding to each angle of incidence.

4. The method of claim 1, wherein the step of determining the paths comprises determining:
   the angles of incidence, reflection and refraction for each ray travelling through the, or each, film,
   the angle ($\delta$) swept through the, or each, film as the ray travels therethrough, between interfaces, relative to the centre of curvature of the substrate,
   the path length of the ray through the, or each, film, and
   the reflectance and transmission at each interface on which the ray is incident.

5. The method of claim 1, further comprising representing a sequence of layers through which the light ray path passes by a vector of integers.

6. The method of claim 1, wherein the method is repeated for an alternative polarization of light for each of the rays.

7. The method of claim 1, wherein the beam of radiation is focussed such that the longitudinal axis of the beam extends through the point of centre of curvature of the substrate.

8. The method of claim 1, wherein the beam of radiation is focussed to a diameter of approximately 1 µm or less.

9. The method of claim 1, wherein the thickness and curvature is determined for a coating disposed upon a stent or other medical device.

10. A non-transitory carrier medium carrying computer readable program code configured to cause a computer to carry out a method of determining the thickness, or curvature, of a thin film, or stack of thin films, disposed on the surface of a substrate having curvature, the method comprising the steps of:
    generating a beam of radiation;
    focusing the beam through the at least one film onto a surface of the substrate;
    measuring the intensity variations across the reflected beam in the Fourier plane;
    for each of a plurality of angles of reflectance corresponding to positions within the Fourier plane, (i) determining, based at least in part on parameters chosen to describe the film or stack of films, the paths of a plurality of rays sharing the angle of reflectance but having different angles of incidence and computing complex amplitudes of reflected light associated with the rays, and (ii) summing over the complex amplitudes associated with the paths, thereby obtaining calculated Fourier plane intensity variations;
    comparing the calculated Fourier plane intensity variations with the measured intensity variations; and
    iteratively refining the parameters so as to optimize agreement between the calculated and measured intensity variations to thereby determine the thickness or curvature of the film, or stack of films, from the angularly dependent intensity measurement.

11. The non-transitory carrier medium of claim 10, the computer readable program code being configured to cause a computer to, further, select a plurality of predetermined angles of incidence.

12. The non-transitory carrier medium as claimed in claim 11, the computer readable program code being configured to cause a computer to carry out the method wherein the thickness, or curvature, of the at least one films is determined by:
    determining for each of the selected angles of incidence and each individual path the angles of reflectance associated therewith, and
    interpolating between each of the angles of reflectance in the Fourier plane and thereby determining the complex amplitude of the reflected light at angles corresponding to each angle of incidence.

13. The non-transitory carrier medium of claim 10, the computer readable program code being configured to cause a computer to carry out the method wherein the step of determining the path comprises determining:
    the angles of incidence, reflection and refraction for each ray travelling through the, or each, film,
    the angle ($\delta$) swept through the, or each, film as the ray travels therethrough, between interfaces, relative to the centre of curvature of the substrate,
    the path length of the ray through the, or each, film, and
    the reflectance and transmission at each interface on which the ray is incident.

14. The non-transitory carrier medium of claim 10, the computer readable program code being configured to cause a computer to carry out the method wherein a vector of integers represents a sequence of layers, through which the light ray path passes.

15. A device comprising:

a program memory containing processor readable instructions, and a processor configured to read and execute instructions stored in said program memory, wherein said processor readable instructions comprise instructions configured to control said device to carry out a method of determining the thickness, or curvature, of a thin film, or stack of thin films, disposed on the surface of a substrate having curvature, comprising the steps of:

generating a beam of radiation;

focusing the beam through the at least one film onto a surface of the substrate;

measuring the intensity variations across the reflected beam in the Fourier plane;

for each of a plurality of angles of reflectance corresponding to positions within the Fourier plane, (i) determining, based at least in part on parameters chosen to describe the film or stack of films, the paths of a plurality of rays sharing the angle of reflectance but having different angles of incidence and computing complex amplitudes of reflected light associated with the rays, and (ii) summing over the complex amplitudes associated with the paths, thereby obtaining calculated Fourier plane intensity variations;

comparing the calculated Fourier plane intensity variations with the measured intensity variations; and iteratively refining the parameters so as to optimize agreement between the calculated and measured intensity variations to thereby determine the thickness or curvature of the film, or stack of films, from the angularly dependent intensity measurement.

16. The device of claim 15, wherein said processor readable instructions comprise instructions configured to control said device to carry out the method wherein, prior to measuring the intensity variations across the reflected beam, to select a plurality of predetermined angles of incidence, corresponding to particular positions in the Fourier plane, each angle corresponding to one of the plurality of rays.

17. The device of claim 16, said processor readable instructions comprising instructions configured to control said device to carry out the method wherein the thickness, or curvature, of the at least one films is determined by:

determining for each of the selected angles of incidence and each individual path the angles of reflectance associated therewith, and interpolating between each of the angles of reflectance in the Fourier plane and thereby determining the complex amplitude of the reflected light at angles corresponding to each angle of incidence.

18. The device of claim 15, said processor readable instructions comprising instructions configured to control said device to carry out the method wherein the step of determining the path comprises, for each selected angle of incidence, determining:

the angles of incidence, reflection and refraction for each ray travelling through the, or each, film, the angle ($\delta$) swept through the, or each, film as the ray travels therethrough, between interfaces, relative to the centre of curvature of the substrate, the path length of the ray through the, or each, film, and the reflectance and transmission at each interface on which the ray is incident.

19. The device of claim 15, said processor readable instructions comprising instructions configured to control said device to carry out the method wherein a vector of integers represents a sequence of layers, through which the light ray path passes.

* * * * *